United States Patent [19]
Bradshaw

[11] Patent Number: 4,494,596
[45] Date of Patent: Jan. 22, 1985

[54] METHOD AND APPARATUS FOR CONDITIONING AIR TEMPERATURE AND HUMIDITY

[75] Inventor: Norman F. Bradshaw, Surrey, England

[73] Assignee: Haden Schweitzer Corporation, Madison Heights, Mich.

[21] Appl. No.: 434,077

[22] Filed: Sep. 29, 1982

Related U.S. Application Data

[62] Division of Ser. No. 150,537, May 16, 1980, Pat. No. 4,367,787.

[51] Int. Cl.$^3$ ............................................. F24F 3/14
[52] U.S. Cl. ................................. 165/20; 261/129; 261/130; 261/131; 261/137; 261/146; 261/153; 261/157; 261/DIG. 34; 55/226; 165/21; 165/39; 165/60; 165/36; 165/101; 165/103
[58] Field of Search ................... 165/3, 21, 35, 36, 39, 165/60, 101, 103; 98/38 R, 38 A, 115 SB; 236/44 B, 44 C; 62/176.4, 176.5, 304, 309, 311; 55/226; 261/63, 129, 130, 131, 137, 146, 153, 157, DIG. 34

[56] References Cited

U.S. PATENT DOCUMENTS

| | | | |
|---|---|---|---|
| 1,075,197 | 10/1913 | Cramer | 236/44 C |
| 1,416,218 | 5/1922 | Lissauer | 165/60 |
| 1,913,659 | 6/1933 | Chester | 165/59 |
| 2,105,882 | 1/1938 | Fleisher | 165/3 |
| 2,208,443 | 7/1940 | Ashley | 62/176.4 |
| 2,218,468 | 10/1940 | Haines | 62/176.4 |
| 2,239,190 | 4/1941 | Chambers | 62/176.4 |
| 2,244,551 | 6/1941 | Crawford | 62/176.4 |
| 2,254,185 | 8/1941 | Newton | 62/176.4 |
| 2,334,427 | 11/1943 | McGrath | 62/176.4 |
| 2,338,382 | 1/1944 | Marlow | 165/20 |
| 3,195,622 | 7/1965 | Haufler et al. | 165/101 |
| 4,173,924 | 11/1979 | Bradshaw | 98/115 SB |

Primary Examiner—Allen M. Ostrager
Attorney, Agent, or Firm—Krass & Young

[57] ABSTRACT

An air conditioning system is disclosed for adjusting air temperature and humidity to a predetermined level for the air supply to a paint spray booth. The system includes a multi-section sprayed surface heat exchanger combined with a bypass passage such that a portion of the air flow to be conditioned passes through the multi-section heat exchanger and the remainder of the flow bypasses the same, and is recombined and mixed downstream with the conditioned air to produce a mixture which is at the proper dry bulb temperature and relative humidity. Each multi-section heat exchanger may be shut off to increase the proportion of bypass flow. Modulation of the cooling and heating effect of each of the heat exchangers is achieved by modulating valving controlling the flow of heating or cooling medium. Similarly, the humidification effect is controlled by valving controlling a number of water spray nozzles. The system is integrated into an energy conserving system which utilizes the recovered energy from the conditioned air after passing through the spray booth and from other low grade heat energy sources.

6 Claims, 4 Drawing Figures

METHOD AND APPARATUS FOR CONDITIONING AIR TEMPERATURE AND HUMIDITY

This application is a division of application Ser. No. 150,537, filed 5/16/80, now U.S. Pat. No. 4,367,787.

TECHNICAL FIELD

This invention concerns air conditioning systems and more particularly air conditioning systems for controlling the humidity and temperature of air supplied to paint spray booths.

BACKGROUND ART

It is often necessary in industrial and other applications to supply an air flow at relatively closely controlled humidity and temperature conditions. One such application is in the supply of air to paint spray booths wherein water-based paints are to be applied. Such processes typically require a 75° F. dry bulb air temperature and 50% relative humidity, i.e., 55° F. wet bulb temperature.

The use of such water-based paints in such applications as automotive paint spraying has become more widespread due to the lessening of the pollution problems associated with hydrocarbon solvent-based painting operations.

Such controlling of temperature and humidity has heretofore required relatively extravagant expenditures of energy. For example, if the air temperature in the summertime is at a higher temperature than required, and if the moisture content is also above the required level (as would typically be the case for summertime weather conditions), both the temperature and moisture content of the air must be reduced. If such moisture is removed mechanically, i.e., by passing such air through a heat exchanger where it is chilled to the appropriate dew point, i.e., 55° F. as per the example given, the air flow must then be reheated to the required 75° F. dry bulb temperature.

Given the enormous volumes of air flow which must be conditioned for typical automotive paint spraying installations, i.e., of the order of 100,000 CFM for each 10 foot length of spray booth, such energy expenditures become truly significant.

For humidifying, moisture may readily be added to flowing air mass by the use of high efficiency spray nozzles directed over a heat exchanger in which the air can be saturated, i.e., to 100% relative humidity. It is difficult however to control humidification by this process at lower levels, i.e., to 50% relative humidity.

Such addition of moisture to the air generally produces an evaporative cooling of the air mass such that dry bulb temperature may be below the required temperature after humidifying, thus requiring reheating.

There has heretofore been proposed and practiced dehumidification processes which do not cool the total air mass to the required dew point, in the interest of achieving improved efficiency. In such processes, a portion of the air flow is bypassed around the cooling coils such that only a portion of the air flow is cooled to a lower dew point temperature. This air mass thus is reduced to a lesser humidity level than required such that upon remixing with the bypass air flow, the combined mixture of the air flow is at the appropriate humidity and temperature condition.

Air conditioning systems of this type typically must accommodate great temperature and humidity variations in the ambient air, and the degree of modulation of the bypass air flow must be relatively great in order to achieve the final controlled air condition. The necessity of a relatively large modulation of the bypass air flow volume necessitates a complex damper system associated with the cooling coils and the bypass passage and greatly increases the bulk of the necessary ducting.

Also, the air flow characteristics of the system are difficult to properly balance particularly for high volume systems due to the flow resistance of the cooling coils.

For similar reasons, it is difficult to properly control the damper system modulation such as to closely and stably control the conditioned air flow if large variations in flow across the heat exchangers is required.

In many of these systems, it is difficult to achieve an accurately controlled humidification-dehumidification, cooling-heating process such that subsequent reheating is not required.

Such bypass flow arrangements must insure complete mixing of the bypass air with the conditioned air such as to avoid stratification in which different points within the air mass are at different humidity and temperature levels.

The present inventor's prior U.S. Pat. Nos. 4,173,125 ("Energy Recovery System") and 4,173,924 ("Paint Spray Booth With Air Supply System") disclose arrangements whereby relatively low grade heat energy may be recovered and utilized in air conditioning processes, in the interest of improving the overall efficiency of industrial processes. It is of course advantageous if any such air conditioning apparatus could utilize low grade energy heat source, or the energy value represented by exhausted cooled air, to enhance the efficiency of the conditioning process.

Accordingly, it is an object of the present invention to provide a method and apparatus of conditioning air to predetermined temperature and humidification levels which is highly efficient in the usage of energy in achieving such controlled levels.

It is yet another object of the present invention to provide such method and apparatus in which predetermined dry bulb temperature levels are achieved with a minimal amount of reheating of the air flow after mechanical dehumidification.

It is still another object of the present invention to provide a sprayed surface cooling-heating coil arrangement for carrying out the humidification-dehumidification and heating-cooling of the air flow in which the final humidity and temperature levels can be closely controlled.

It is yet another object of the present invention to provide a sprayed coil arrangement for humidification-dehumidification and cooling-heating of the air mass combined with a bypass flow damper for remixing unaltered air to achieve a given humidity and temperature level, in which the portion of damper controlled bypass flow necessary to achieve a given final condition is minimized.

It is still another object of the present invention to provide such sprayed coil humidification-dehumidification and heating-cooling of an air mass flowing therethrough with minimal bypass flow modulation necessary in order to accommodate varying ambient air temperature and humidity levels.

It is still another object of the present invention to provide a bypass ducting arrangement in which the air passing through the heat exchanger and the bypass passage are intimately mixed to provide a homogeneous conditioned air mass at appropriate temperature and humidity levels.

It is still another object of the present invention to provide such method and apparatus for achieving controlled humidity and temperature levels in which low grade energy recovered from waste heat sources and/or the energy value in cooled air to be rejected to the atmosphere are efficiently utilized in the conditioning process.

It is still a further object of the present invention to provide an air supply system for a paint spray booth in which ambient air either under summertime or wintertime conditions can be conditioned to appropriate temperature and humidity levels in a highly efficient manner, with a minimum of plant equipment.

SUMMARY OF THE INVENTION

These and other objects of the present invention, which will become apparent upon a reading of the following specification and claims, are achieved by the use of air conditioning apparatus including a sprayed surface multi-section heat exchanger through which at least a portion of the air flow to be conditioned is directed. Each of the heat exchanger sections are provided with a modulated flow of heating-cooling heat transfer medium to transfer heat into or out of the air flow to establish the capability of dehumidifying the air by chilling the air mass to the appropriate dew point. This also affords the capability of accurately adjusting the air flow temperature to achieve a given final dry bulb temperature.

A bypass flow duct is also provided in which a modulated portion of the total air flow may bypass the heat exchanger which is remixed with the mass of air flow passing through the coil such that a combined mixture of air mass will be at the appropriate humidity and dry bulb temperature levels.

The heat exchanger comprises a plurality of heat exchanger sections arranged in banks, each section adapted to be independently turned off through the use of three-way valves controlling the flow of warmed or cooled heat transfer medium therethrough such as to enable increased proportions of unconditioned or bypass air mass flow.

Thus, the air bypass technique may be utilized which requires only relatively small bypass ducting with only a damper control over the bypass ducting flow, with substantially unaltered direct flow through the heat exchanger. This reduces the bulk of the plant required and minimizes the difficulties encountered in attempting to vary substantially the air flow through the heat exchanger.

An array of water spray nozzles is mounted upstream of the heat exchanger and across the face thereof to direct water spray onto the surface of the heat exchanger sections. The spray nozzles array is arranged in a manifolding system with independently controlled shut-off valves in order to control the degree of humidification as necessary. Combined with the modulation of the temperature of the air passing through the heat exchanger section and the proportion of bypass flow, the final condition of the remixed air mass may be closely controlled with minimum, if any, heating required depending on the incoming air condition.

The heat exchanger sections are integrated with an energy recovery system and also with a preheating and reheating heat exchanger positioned upstream and downstream, respectively, of the air conditioning heat exchanger such as to efficiently utilize low grade heat recovered from waste heat energy sources and also to utilize the energy value of cooled air to be exhausted.

The air conditioning apparatus is incorporated into a supply system for a paint spray booth in which air passes through the spray booth and is filtered and thence passes through a heat recovery coil in the booth exhaust to recover either the heat energy contained in the exhausted air or to recover the energy value represented by the cooled air in the event that ambient temperature is above the spray booth supply conditions.

The bypass air flow is remixed into the main air mass through a distribution ducting and a series of high velocity jetting nozzles which insure complete mixing of the bypassed air into the conditioned air to achieve a homogeneous air mass.

A control system is provided in which the bypass dampers, the spray nozzle shut-off valves, the heat exchanger modulating valve, section shut-off and the preheater and reheater are all controlled to produce a predetermined final dry bulb temperature and humidity level for varying ambient or inlet air states so as to efficiently supply air to a paint spray booth.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
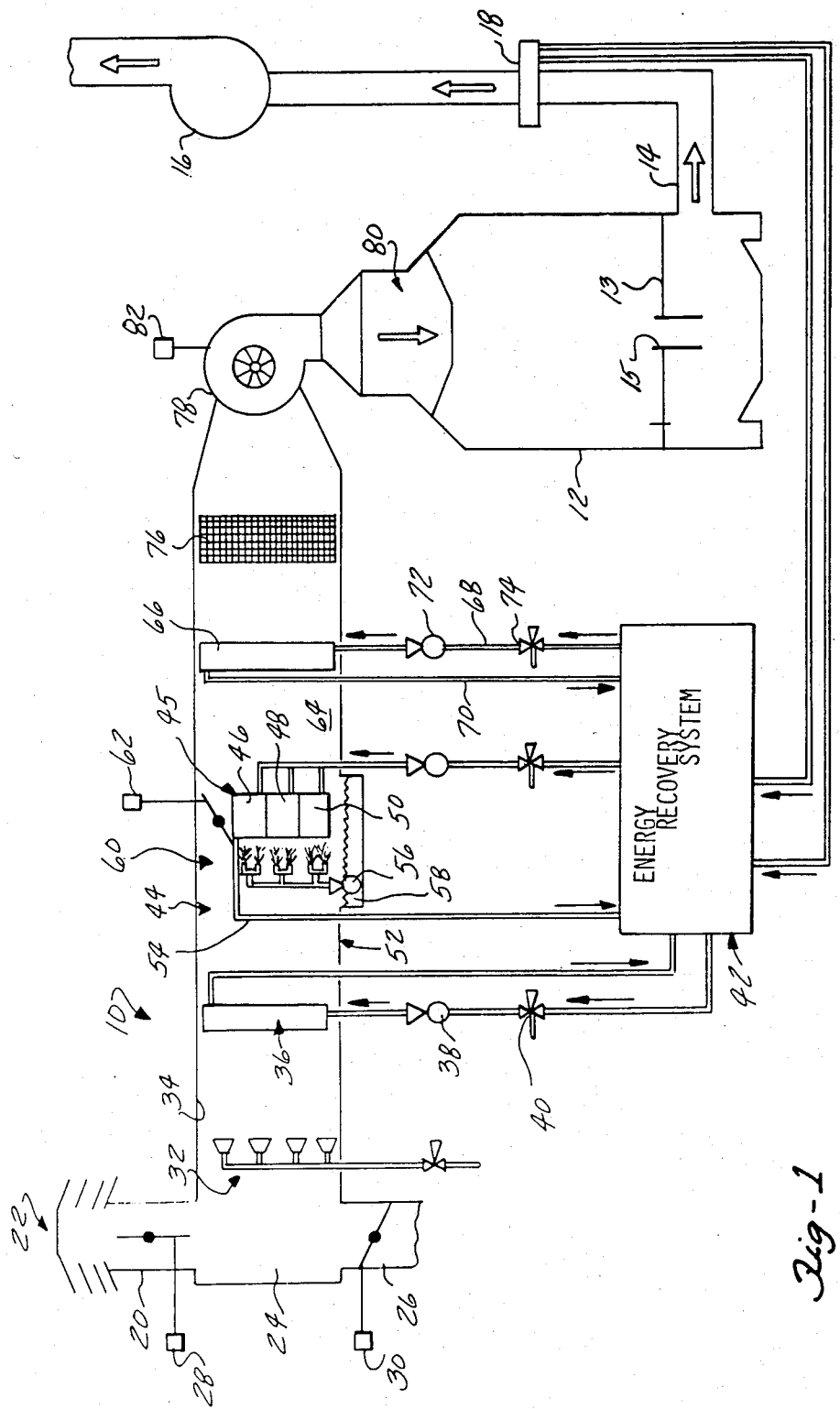
FIG. 1 is a diagrammatic representation of an air conditioning system for a paint spray booth air supply utilizing an air conditioner apparatus according to the present invention.

Referring to the drawings and particularly FIG. 1, a diagrammatic representation of the overall system is depicted. Such air conditioning system is indicated at 10 and is associated with an enclosure, depicted as a paint spray booth 12, within which paint spraying operations are to be conducted as in the production of automotive car bodies.

In U.S. Pat. No. 4,173,924, a particular paint spray booth 12 design is disclosed of the same general type as that disclosed in U.S. Pat. No. 4,222,319, and assigned to the same assignee as the present application.

This is advantageously combined with the present air conditioning system inasmuch as a high efficiency filtration system is incorporated which enables the exhaust air flow indicated at 14 to be substantially free from overspray paint solids.

Accordingly, the exhaust flow created by means of an exhaust fan 16 may be passed through a heat recovery exchanger 18 disposed in the exhaust ducting to extract energy from the air prior to exhausting to the atmosphere.

This heat energy may take the form of heat removed from the exhaust air flow prior to exhaust to the outside or may be that energy corresponding to that of cooled air prior to its exhaust to warmer ambient temperatures, as described more fully in aforementioned U.S. Pat. No. 4,173,924.

Such filtration system includes a flooded floor pan 13 and exit tubes 15 through which are caused to be circulated a vortical flow of water to produce a "scrubbing" of the exhaust air in a manner more completely described in the aforementioned patent application.

Referring to the air conditioning system 10, this system includes an air intake housing 20 positioned to receive air intake from the ambient outside air through stack 22 and into a plenum chamber 24.

Alternatively or additionally, the air supply for the system may be pretreated air, i.e., air received from some other source than ambient outside conditions to the supply duct 26. Dampers and controllers 28 and 30 are provided, respectively, to control the air flow into the plenum chamber 24.

The air conditioning system 10 is intended for application to the conditioning of air under typical wintertime or summertime conditions, as well as intermediate seasonal conditions such that provision is made for increasing the temperature of subzero outside air to a temperature condition in excess of freezing.

For such heating, a direct gas-fired preheater 32 is provided comprising an array of burners disposed directly in the inlet ducting 34. Such preheaters may be of conventional design and are activated whenever the outside air temperature declines below the capacity of other heater means in the system to be described.

For moderately low temperatures, preheating means may be provided by a heat exchanger 36 through which is caused to circulate warmed water or ethylene glycol as by means of a pump 38. Such circulation is under the control of a suitable modulating valve 40.

The energy source for heating such circulated fluid may advantageously be provided by an energy recovery system generally indicated at 42. Such energy recovery system is preferably of the type disclosed in U.S. Pat. No. 4,173,924 in which heat energy is recovered from the air exhausted from the paint spray booth 12, the heat recovery means also including the heat recovery exchanger 18 which is operatively associated with the evaporator and condenser of a mechanical refrigeration unit (not shown) such as to enable efficient transfer of heat energy from the exhausting air into such circulated fluid.

A similar but more generalized application system is disclosed in U.S. Pat. No. 4,172,125 wherein heat is recovered from various industrial processes or other sources of waste heat which typically exist around an industrial plant. Such heat energy is likewise caused to be collected and efficiently utilized through heat transfer arrangements associated with mechanical refrigerator and evaporator and condensing coils of such units.

The disclosures of the aforementioned patents are hereby incorporated by reference into the present specification inasmuch as such energy recovery systems are, as noted, preferably employed as the energy recovery system indicated at 42 in FIG. 1.

Downstream of preheating heat exchanger 36 is air conditioning apparatus 44 according to the present invention in which moisture is added or removed from the air mass flowing therethrough to achieve the required level and in which the temperature of the air mass is adjusted to the required conditions with minimum expenditure of energy required for subsequent reheating.

The air conditioning apparatus 44 includes a multi-section heat exchanger 45 including sections 46, 48 and 50 contemplated as fin-on-tube coils, each adapted to receive a portion of the air mass flowing through the ducting 52.

Arrayed across the front face of the heat exchangers is a series of spray nozzles 54, adapted to add moisture so as to saturate the air flow passing through the multi-section heat exchanger 45. A circulating pump 56 causes water disposed in a drain pan 58 to be circulated and thence recollected after draining from the respective coil surfaces. A water supply system, not shown, adds water as needed to the drain pan 58.

A portion of the air mass flowing in ducting 52 is caused to be passed through a bypass flow ducting 60, which receives a relatively minor portion, i.e., on the order of 25%, of the total air flow flowing through the ducting 52. A damper and controller 62 are provided to modulate the precise volume of air flowing through the bypass flow ducting 60.

The air is remixed in the ducting 64 immediately downstream of the air conditioner apparatus 44 to produce a mixture at or close to the final humidity and temperature conditions to be achieved.

A reheat exchanger 66 is also provided which adjusts the final dry bulb temperature of the air mass as necessary after passing through the air conditioning apparatus 44.

If such reheating is required due to operating conditions, the reheat exchanger 66 is provided with warm water or other heat transfer medium circulated in lines 68 and 70 with a circulating pump 72 provided in series with the modulating valve 74 controlling the precise quantity of liquid in order to precisely control the temperature of the air mass exiting through the preheat exchanger 66 at the predetermined controlled temperature level.

Since such temperatures are relatively moderate, it is likewise contemplated that the heat energy required would be supplied by an energy recovery system 42 of the type described above.

A filter 76 is provided immediately upstream of the paint spray booth 12 in order to remove any solid or liquid contaminants which are suspended in the air mass.

A supply fan 78 is provided drawing flow into the ducting 52 and the various conditioning apparatus, and thence into a plenum 80 above the ceiling of the paint spray booth 12.

A supply damper and controller 82 are provided in order to control the volume of air flow in the chamber to the system requirements.

Figure 2:
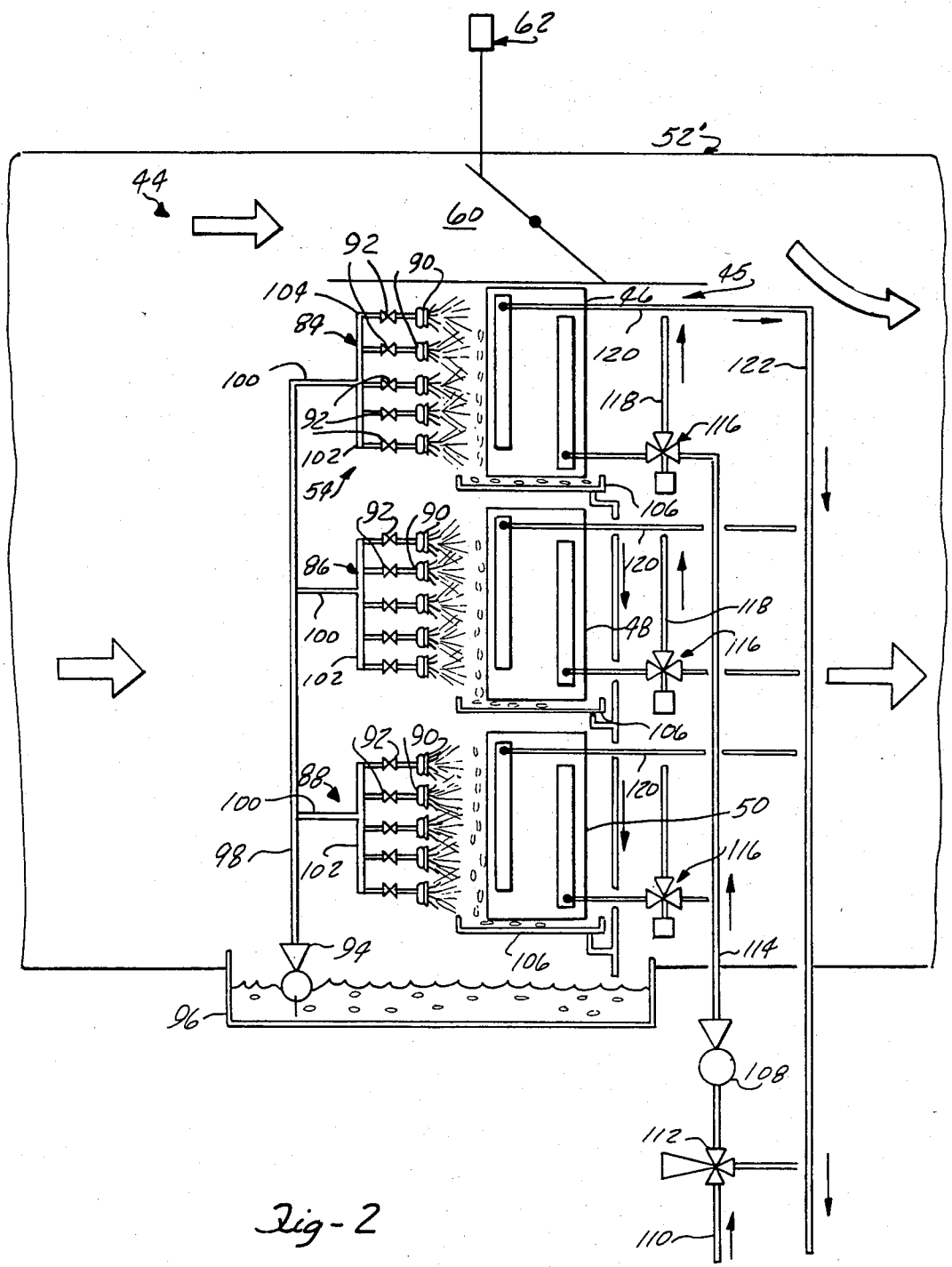
FIG. 2 is a detailed diagrammatic representation of the air conditioner utilized in the system depicted in FIG. 1.

Referring to FIG. 2, the details of the air conditioning apparatus 44 are depicted. This typically includes three sections of heat exchangers 46, 48 and 50 disposed to intercept respective portions of the air flow passing through the ducting 52. Disposed upstream of each section of the heat exchangers 46, 48 and 50 are corresponding groups of spray nozzles 54 including respective groups 84, 86 and 88 positioned so as to direct a spray onto the front face of each of the heat exchanger sections. Each spray nozzle group includes individual spray nozzles 90 located in a pattern such as to cover the area of the heat exchanger sections 46, 48 and 50 in a density of approximately one per square foot of the cross sectional area.

Each of the spray nozzles 90 is controlled with solenoid operated shut-off valves 92 such as to allow individual control of water flow to the spray nozzles 90.

Water under pressure is provided via the circulating pump 94 (pump 56 in FIG. 1) drawing water from drain tank 96 (tank 58 in FIG. 1) pressurizing main lines 98 and feeder lines 100 which in turn feed branch lines 102 supplying each of the passages 104 connecting the shut-off valves 92 and spray nozzles 90.

The run-off from the heat exchanger sections 46, 48 and 50 is captured in drain trays 106 which cascade through a drain arrangement to return the run-off to the drain tank 96.

In order to control the proportion of air flow which is humidified, the shut-off valves 92 are operated by a system controller to modulate or discontinue the addition of moisture to a corresponding proportion of the air flow. Each of the heat exchanger sections 46, 48 and 50 is supplied with the heated or cooled heat transfer media such as brine via a circulation pump 108 receiving a supply of such liquid through line 110 and modulating valve 112.

Modulating valve 112 provides a means for controlling the fluid temperature supplied to an outlet line 114 of circulation pump 108. The regulation of fluid temperature controls the degree of heat transferred into or out of the air flow passing across the heat exchanger sections 46, 48 and 50 such as to provide relatively precise degree of modulation.

Outlet line 114 supplies the inlet line of each of the heat exchanger sections 46, 48 and 50 through three-way valves 116 which enable bypass of the heat transfer media flow through bypass passages 118 connected to the outlet passages 120 of each of the respective heat exchanger sections 46, 48 and 50, each connected to main return line 122.

Thus, the heating or cooling of each section may be discontinued to effectively increase the bypass flow proportion without affecting the air flow therethrough. The step-by-step control afforded by the multi-section construction of the heat exchanger 45 also affords an additional level of temperature control over that afforded by the modulating valve 112.

Thus, while only a relatively modest degree of bypass air flow through the bypass flow ducting 60 is required with only minor modulation thereof by the damper and controller 62, a high degree of continuous control over the humidity and temperature levels of the air mass flowing therethrough is afforded in a highly efficient manner by the control over the conditioning activity carried out in the air conditioning apparatus 45.

If the air is too humid, mechanical dehumidification is achieved by chilling the air mass below its dew point and condensing out a required amount of moisture. However, the air mass must be chilled from the incoming temperature to the dew point temperature before condensation begins to occur and conventionally the entire mass is chilled to this level which must be reheated to the appropriate dry bulb temperature.

If, however, as with the described apparatus, only a portion of the air mass is chilled to an appropriately lower dew point, upon remixing with the bypassed air, the proper humidity level of the total air mass may be achieved.

An increase in efficiency of the process is thus realized since only a portion of the air must be chilled from its incoming temperature to a dew point temperature. The degree of chilling required to condense out the required weight of moisture would be the same in either case.

In executing the sprayed surface humidification process, it is relatively easy to saturate the air mass to 100% relative humidity.

However, it is difficult to control such humidification process so as to reach some intermediate level, i.e., such as 50% relative humidity. However, by utilizing the bypass flow ducting 60, it is possible to totally saturate the air mass flowing through the air conditioning apparatus 44 and thence recombining the air flow with the bypassed air flow which is at a higher temperature and lower humidity to yield a mixture of the correct relative humidity, i.e., 50%, and dry bulb temperature, i.e., 75° F.

While the bypass flow ducting 60 itself controls only a relatively minor volume of air flow, by utilizing the shut-off valves 92 as described above, as well as the shut-off of the bypass valves of the heat exchanger sections 46, 48 and 50, an increased bypass proportion can be achieved without the necessity for shifting large volumes of air flow from flowing through the heat exchanger sections.

That is, a portion of the flow through each heat exchanger section may in effect become a bypass air flow and thus a relatively large proportion of the flow can be "bypassed" without flowing through the bypass ducting.

It can be appreciated that the various controlled components of this apparatus afford a great deal of flexibility in achieving given temperature and humidity levels. That is, by controlling the incoming air temperature by a preheater and varying a proportion of air bypassed into the bypass passage or to an activated heat exchanger section, by modulating the temperature of the incoming liquid to the heat exchanger sections, by control of the nozzle sprays, and by the use of a reheater to adjust the final dry bulb temperature, the air supplied to the paint spray booth 12 may be controlled in a most efficient manner.

For example, taking wintertime operation, the air may be heated in the preheater 32 or preheat heat exchanger 36 to a temperature in excess of 32° F. Thence, the bypass damper in activation causes all the air flow to pass through the conditioning apparatus 44 wherein the air is saturated with the spray nozzles 54.

At the same time, while circulating warm liquid of an appropriate temperature in the heat exchanger 45, this temperature may be increased to the appropriate dew point, i.e., in this case 55° F., such that there exists 100% relative humidity and 55° F. dry bulb conditions.

Thence, by being passed through the reheat exchanger 66, an increase to the appropriate dry bulb temperature, i.e., 75° F., is achieved.

In some conditions, it may be possible to entirely eliminate the use of the reheater in the interest of improving efficiency.

Accordingly, if the incoming air is heated to 88° F. presuming the ambient air to be at a humidity corresponding to 44° F. dew point by controlling the shut-off valves 92 and damper and controller 62, one-half of the air may be caused to pass through the air conditioning apparatus 44 unconditioned.

The other half of the air is thus passed through the sprayed sections of the heat exchanger sections. This proportion of the air flow will become saturated and reduced in temperature due to the evaporative cooling effect. Upon remixing downstream thereof, the resultant mixture will be at the required 75° F. dry bulb temperature and 50% relative humidity.

Figure 3:
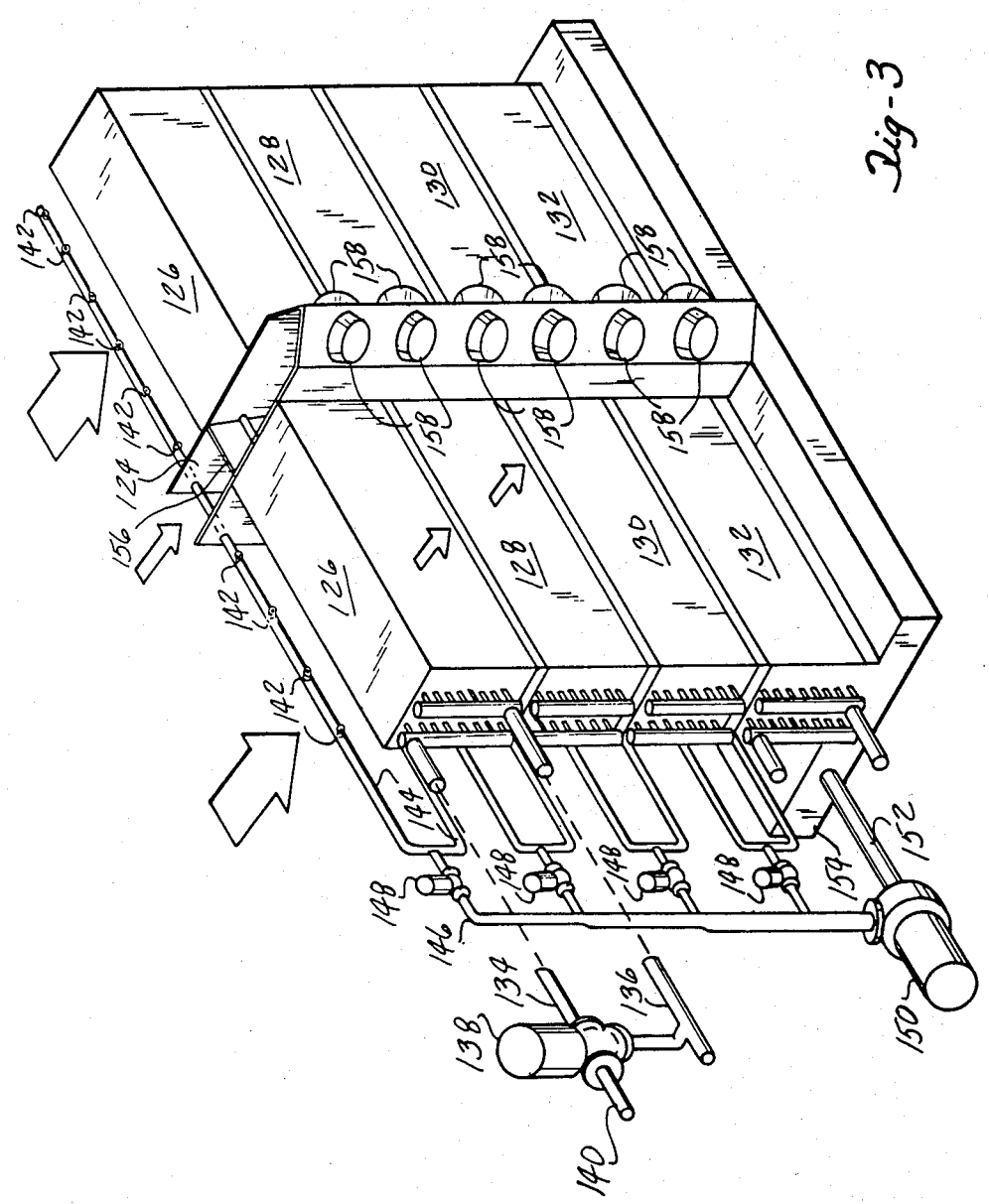
FIG. 3 is a perspective view of an air conditioning apparatus of the type depicted diagrammatically in FIG. 1.

Referring to FIG. 3, an actual physical arrangement of heat exchanger sections, spray nozzles and bypass ducting is shown. In this arrangement, four sections of the heat exchanger are provided, one half of each section arranged on either side of centrally located bypass ducting 124. Each heat exchanger section is comprised of a coil, 126, 128, 130 and 132, of a fin-on-tube design of conventional configuration adapted to receive heating or cooling liquid via inlet lines, one of which is shown for coil 126 at 134 with a return line 136 receiving the circulated fluid for return to the energy recovery system.

Each coil is provided with independently operated three-way valves 138 which enables bypassing of heat transfer media through each of the individual coils 126, 128, 130 and 132 as described above.

A modulating valve is also located upstream of the inlet supply 140 to control the temperature of the heat transfer liquid to in turn control the heating or cooling effect on the air passed through the respective coils 126, 128, 130 and 132.

Also provided is a grouping of spray nozzles 142, arranged uniformly across the upstream face of each of the coils 126, 128, 130 and 132, each receiving water via cross tubes 144 supplied via the supply manifold line 146 with intermediate shut-off valves 148 provided to enable shut-off of the nozzles associated with each of the sections of the coils 126, 128, 130 and 132.

A circulating pump 150 is shown having an inlet 152 communicating with a drain pan 154 positioned beneath each of the coils.

Flow through the bypass ducting 124 is controlled by a series of flap dampers, one of which shown at 156, to control the proportion of flow bypassing the coils entirely.

On the leaving face of each of the coils, the bypass air is adapted to be remixed with the air passing through each of the coils 126, 128, 130 and 132. As described above, preferably this is accomplished by a series of jet nozzles 158 located such as to direct the bypass flow into the air mass exiting the coil sections as shown.

The bypass flow velocity is thereby increased to relatively high rates of flow, i.e., on the order of 4000 feet per minute, in order to produce thorough remixing of the bypass air and mixing of the air exiting coil sections which have been shut-off with air flowing through coil sections which have caused humidifying, cooling or heating of the air passing therethrough.

The cross flow direction of the jets and the mixing induced by the jetting flow pattern insures thorough mixing thereof in order to produce a homogeneous air mass of appropriate humidity and temperature levels.

Figure 4:
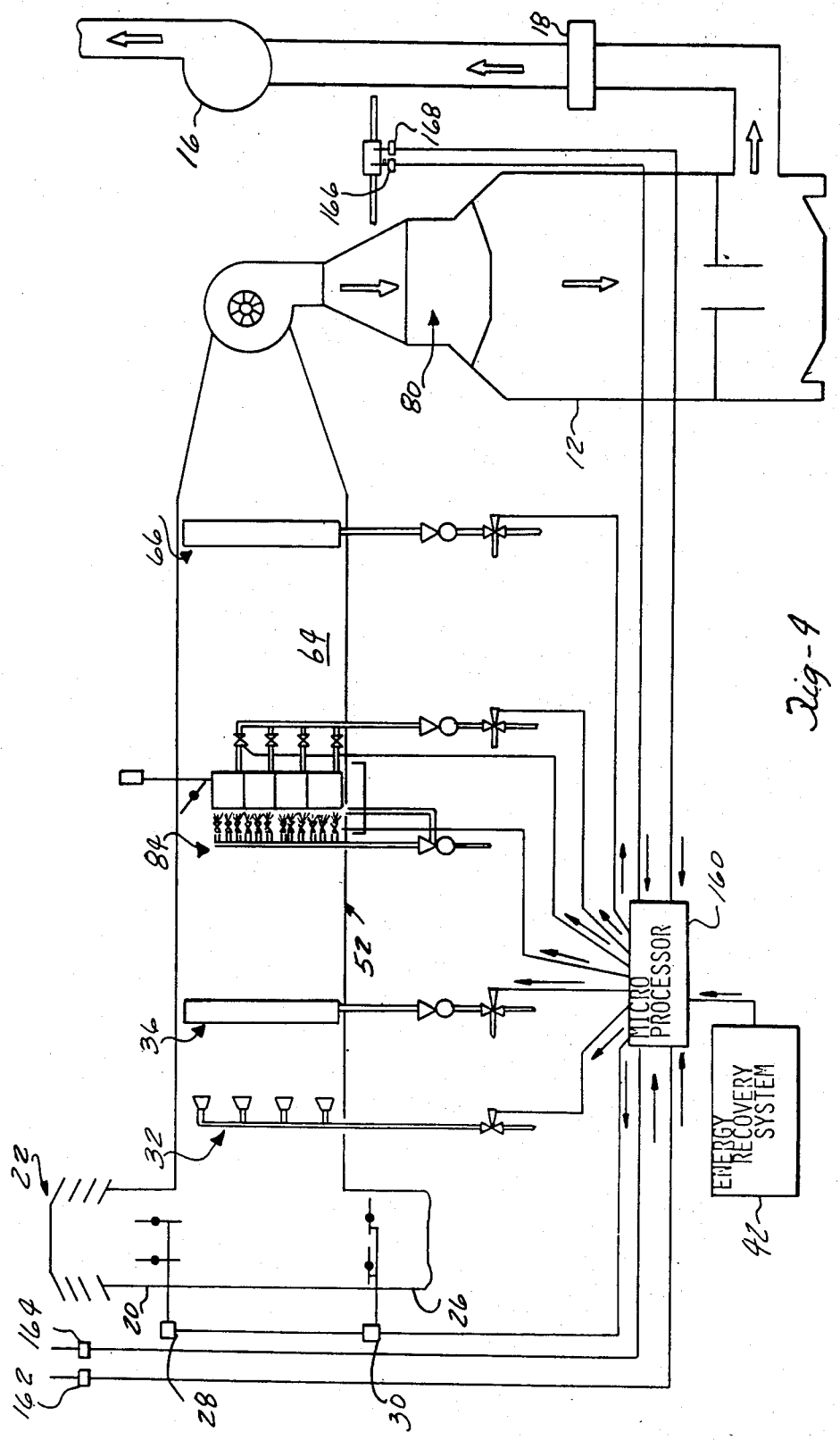
FIG. 4 is a diagrammatic representation of the system depicted in FIG. 1 depicting the control and sensor signals utilized to control the air conditioning system as applied to the supply of air to a paint spray booth.

Referring to FIG. 4, an overall control system arrangement is depicted in diagrammatic form. A microprocessor or other suitable central controller 160 is provided which receives wet and dry bulb sensor signals from the ambient sensors 162 and 164, as well as the supply wet and dry bulb sensors 166 and 168. In the event an energy recovery system 42 is utilized as a source of energy, available heat signals will also be processed in the central controller 160.

These signals are processed to cause the various controlled components to be operated in a mode in which optimum efficiency is achieved. That is, control of the preheater 32, the preheat heat exchanger 36, the air conditioning apparatus 44 and the reheater 66 are all controlled in order to insure a supply of air to the paint spray booth 12 with optimum efficiency for the particular operating conditions.

The embodiments of the invention in which an exclusive property or privilege is claimed are defined as follows:

1. An air conditioning system comprising:
   duct means having an upstream portion and a downstream portion and adapted for carrying a stream of air therethrough;
   multi-section heat exchange means in said duct means mediate said upstream and downstream portions, said multi-section heat exchange means including a plurality of independently controllable sections arranged in parallel across said duct means to receive and treat respective portions of an air stream flowing in said duct means;
   a plurality of banks of spray nozzles for humidifying said air stream and disposed across said duct means upstream of said multi-section heat exchange means, each said bank being operatively associated with a different section of said heat exchange means;
   valve means operatively connected to said nozzles for independently controlling the operation thereof whereby humidification may occur in at least one of said banks independently of humidification in the other of said banks;
   by-pass means arranged in said duct means and in parallel with said multi-section heat exchange means for controllably conveying therein a portion of said air stream around said multi-section heat exchange means whereby said conveyed portion receives neither heat exchange treatment nor humidification; and
   all of the portions of said air stream being remixed at said downstream portion of said duct means to provide an air stream, the qualities of which vary in degree according to the amount of treatment and humidification afforded by said apparatus and the portions of said air stream flowing through and around said heat exchange means.

2. Apparatus as defined in claim 1 further including a damper control means in said by-pass means.

3. Apparatus as defined in claim 1 wherein said by-pass means is mediate at least two sections of said multi-section heat exchange means and further includes mixing nozzle means at an outlet thereof.

4. Apparatus as defined in claim 1 further including a paint spray booth adapted to receive said air stream and having an exhaust portion, means for recovering thermal energy from air passing through said exhaust portion and means for controllably conveying recovered thermal energy to the sections of said multi-section heat exchange means.

5. An air conditioning apparatus for providing conditioning of an air flow to a predetermined dry bulb temperature and humidity level comprising:

ducting means for receiving the air mass flow therethrough;

multi-section heat exchanger means mounted in said ducting means to receive a portion of said air flow in said ducting means, said multi-section heat exchanger means including a plurality of sections disposed across said ducting means and each receiving a proportion of said air flowing through said ducting means;

means for circulating heat transfer media through each section of said multi-section heat exchanger means;

control means for individually controlling heat transfer media flow to each of said heat exchanger means sections;

by-pass ducting means disposed in said ducting to receive the remaining portion of said air flow not received by said heat exchanger means sections;

damper means for controlling air flow through said bypass ducting means;

said ducting means including a section downstream of said heat exchanger means receiving both air flow from said heat exchanger means and said by-pass ducting means;

whereby a mixture of said by-passed air and conditioned air flow is produced and increased by-pass flow through one or more of said heat exchanger means sections may be achieved upon operation of said control means controlling said flow of said heat transfer media to said respective heat exchanger means sections, said apparatus further including a plurality of spray nozzles mounted in said ducting means upstream of said multi-section heat exchanger means for adding humidification to said air mass.

6. Apparatus as defined in claim 5 further including valve means associated with said nozzles for individually controlling of liquid to said nozzles whereby the portions of said air mass flowing through respective sections of said multi-section heat exchanger may receive different degrees of humidification.

* * * * *